(12) United States Patent
Melling et al.

(10) Patent No.: US 12,198,288 B2
(45) Date of Patent: *Jan. 14, 2025

(54) SYSTEMS AND METHODS FOR GENERATING AN IMAGE OF AN AUTOMOBILE

(71) Applicant: Carvana, LLC, Tempe, AZ (US)

(72) Inventors: Alan Richard Melling, Atlanta, GA (US); Pedro Damian Velez Salas, Chamblee, GA (US); Grant Evan Schindler, Atlanta, GA (US); Bruno Jean Francois, Atlanta, GA (US); Remy Tristan Cilia, Atlanta, GA (US)

(73) Assignee: Carvana, LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,264

(22) Filed: Aug. 14, 2023

(65) Prior Publication Data

US 2023/0386161 A1    Nov. 30, 2023

Related U.S. Application Data

(63) Continuation of application No. 17/227,006, filed on Apr. 9, 2021, now Pat. No. 11,727,657.

(51) Int. Cl.
*G06T 19/20* (2011.01)
*G06F 3/04845* (2022.01)
(Continued)

(52) U.S. Cl.
CPC .......... *G06T 19/20* (2013.01); *G06F 3/04845* (2013.01); *G06N 20/00* (2019.01); *G06T 19/006* (2013.01); *G06T 2219/2016* (2013.01)

(58) Field of Classification Search
CPC ................... G06T 19/20; G06T 19/006; G06T 2219/2016; G06T 17/00; G06F 3/04845;
(Continued)

(56) References Cited

U.S. PATENT DOCUMENTS 6,304,284 B1    10/2001 Dunton et al.
7,348,989 B2    3/2008 Stevens et al.
(Continued)

OTHER PUBLICATIONS

Screen captures from YouTube video clip entitled "I Phone & I Pod Easy stand from a charger plug." 4 pages, uploaded on Aug. 1, 2014 by user "grouse201 O". Retrieved from Internet: <https://www.youtube.com/watch?v=SZQI7ItD2L8>.
(Continued)

*Primary Examiner* — Chong Wu
(74) *Attorney, Agent, or Firm* — SNELL & WILMER L.L.P.

(57) ABSTRACT

Systems and methods for generating an image of an automobile can include generating an artificial surface for a 3D model of the automobile, blending the artificial surface with a real world surface, and generating the image of the automobile using a blended surface. The image can have a number of different blended surfaces (e.g., a cleaner floor, shadows for the automobile, reflections for the automobile). The images can be used to create a 360 degree display of the automobile where the blended surface is displayed.

20 Claims, 7 Drawing Sheets

(51) Int. Cl.
*G06N 20/00* (2019.01)
*G06T 19/00* (2011.01)

(58) Field of Classification Search
CPC ........... G06F 3/017; G06F 2203/04806; G06F 3/011; G06N 20/00; G06N 3/045; G06N 3/08
See application file for complete search history.

(56) References Cited

U.S. PATENT DOCUMENTS

| | | | |
|---|---|---|---|
| 7,912,319 | B2 | 3/2011 | Lakshamanan et al. |
| 8,212,812 | B2 | 7/2012 | Tsin et al. |
| 9,659,381 | B2 | 5/2017 | Mullins et al. |
| 9,928,655 | B1 | 3/2018 | Alston |
| 10,284,794 | B1 | 5/2019 | Francois et al. |
| 11,727,657 | B2 * | 8/2023 | Melling ................. G06F 3/017 345/424 |
| 11,810,262 | B2 | 11/2023 | Melling et al. |
| 2003/0117497 | A1 | 6/2003 | Nicolaisen et al. |
| 2006/0269264 | A1 | 11/2006 | Stafford et al. |
| 2007/0263995 | A1 | 11/2007 | Park et al. |
| 2010/0127819 | A1 | 5/2010 | Radivojevic et al. |
| 2010/0214398 | A1 | 8/2010 | Goulart et al. |
| 2011/0104941 | A1 | 5/2011 | Chang et al. |
| 2011/0187323 | A1 | 8/2011 | Gourley |
| 2012/0038636 | A1 | 2/2012 | Montague |
| 2012/0062691 | A1 | 3/2012 | Fowler et al. |
| 2012/0293683 | A1 | 11/2012 | Osaka et al. |
| 2012/0300019 | A1 | 11/2012 | Yang et al. |
| 2012/0306999 | A1 | 12/2012 | Zhou |
| 2012/0320148 | A1 | 12/2012 | Unger |
| 2013/0084773 | A1 | 4/2013 | Mimlitch et al. |
| 2013/0181098 | A1 | 7/2013 | Lin |
| 2014/0028713 | A1 | 1/2014 | Keating et al. |
| 2014/0117193 | A1 | 5/2014 | Wong |
| 2015/0188591 | A1 | 7/2015 | Shen et al. |
| 2017/0193687 | A1 | 7/2017 | Lo et al. |
| 2017/0206691 | A1 | 7/2017 | Harrises et al. |
| 2019/0065027 | A1 | 2/2019 | Hauenstein et al. |
| 2020/0320727 | A1 | 10/2020 | Smolic et al. |
| 2022/0189124 | A1 * | 6/2022 | Sanor ................... G06T 19/006 |
| 2022/0277512 | A1 | 9/2022 | Ito |
| 2022/0284662 | A1 | 9/2022 | Bond |

OTHER PUBLICATIONS

Wikipedia. "File: Image explaining how Cycloramic iPhone app Works.png." Retrieved Jul. 30, 2013. 5 pages.

* cited by examiner

SYSTEMS AND METHODS FOR GENERATING AN IMAGE OF AN AUTOMOBILE

CROSS-REFERENCE TO RELATED APPLICATIONS

This application is a continuation of U.S. application Ser. No. 17/227,006 filed Apr. 9, 2021 and entitled "SYSTEMS AND METHODS FOR RENDERING A PORTION OF A 3D DISPLAY," which is herein incorporated by reference in its entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

This disclosure relates generally to 3D modeling, and more specifically to generating 3D presentations of real world objects.

BACKGROUND

Systems for displaying and generating modern 3D displays (e.g., augmented reality, virtual reality, panorama photography, photosphere photography, etc.) have made many advances in recent years, but still suffer from a number of problems. For example, bespoke models of items in a 3D display are normally rendered by hand by a trained professional (e.g., a graphic designer or animator). This manual process causes these models to be expensive and time consuming to produce due to their complexity. Further, the large amount of time it takes a professional to generate a bespoke 3D model makes it difficult to scale the modeling process while still maintaining high real world fidelity to the object.

One approach to this problem is to use machine learning algorithms (e.g., predictive algorithms) while crafting the bespoke model, but this too presents its own challenges. While machine learning algorithms (e.g., unsupervised learning, deep learning, supervised learning, etc.) are becoming more commonplace in today's computer systems, many data scientists and software engineers continue to encounter problems while training novel machine learning algorithms. One problem encountered when training machine learning algorithms is due to a lack of adequate amounts of representative training data. Machine learned algorithms trained on problematic training data suffer from a number of flaws. For example, machine learned algorithms trained on an insufficient amount of data can be inaccurate and, depending on the content of the training data, can overpredict or underpredict outcomes. Further, machine learned algorithms trained on non-representative training data can be skewed due to a unique event in the training data (e.g., an over representation over a specific label in a dataset). These inaccuracies also can pose problems for 3D display systems, as a severely overpredicted outcome can lead to poor accuracy and low real-world fidelity.

In the past, solutions to this problem of poor or insufficient amounts of training data have been simply to (1) gather more training data, (2) purchase higher quality training data sets from a vendor, or (3) use a pre-trained model. Each of these past solutions had their own limitations. In many instances, gathering more training data can be time consuming due to the large corpus of training data need to accurately train a machine learning model. Purchasing training data also can pose problems, as these training datasets can be expensive and can become outdated quickly. The disadvantages of pre-trained models are similar to those seen with purchased training data, as pre-trained models also can be expensive when they are bespoke and can become outdated quickly without updating or re-training. Further, embeddings that have not been seen before by a model or are new can be misclassified by a model (pre-trained or not) due to a lack of representation in training data (either gathered or purchased). Each of these problems can be compounded when the training data is high dimensional because this can cause an increase in processing times for training the machine learning algorithm and using the trained machine learning algorithm to make predictions.

With regards to 3D displays created using a 3D scanner, even further problems exist. First, using machine learning algorithms in combination with a 3D scanner can lead to incorrect tracking of feature points on the item being scanned. In some instances, this problem occurs due to the presence of highly reflective (e.g., shiny or mirrored) surfaces on the item. When a feature selection or tracking algorithm identifies one of these reflective surfaces as a feature, inaccuracies can be introduced into the 3D model. This additional problem can occur because these reflective surfaces will shift depending on the capture angle or the lighting of the image, while the feature selection or tracking algorithm assumes that features are stationary on the surface of the model. Second, when high throughput 3D scanners are used, stages for the item quickly accumulate dirt, grime, or other deleterious elements that produce poor quality images. However, shutting down the 3D scanner to clean the stage can lower the rate at which bespoke 3D scans are generated, and this, therefore, should be minimized in a high throughput system.

BRIEF DESCRIPTION OF THE DRAWINGS

To facilitate further description of the embodiments, the following drawings are provided in which.

Figure 1:
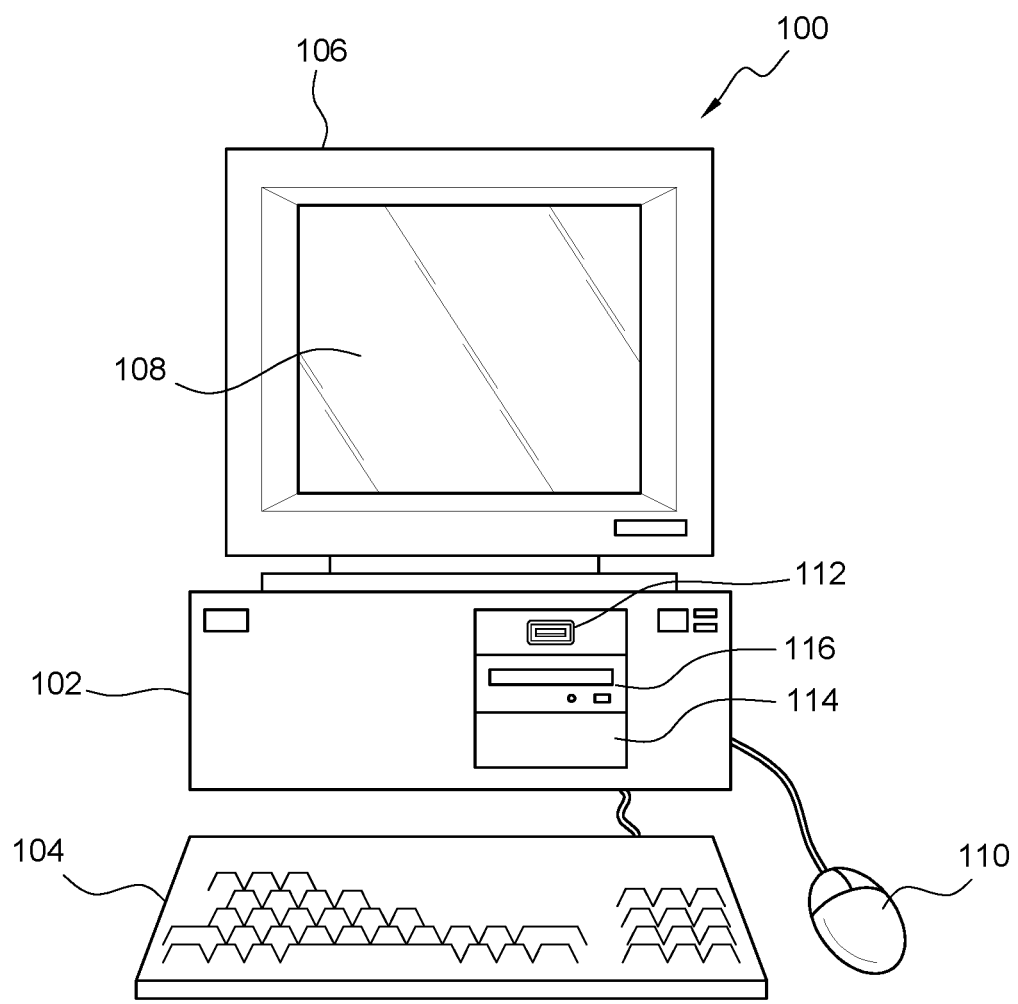
FIG. 1 illustrates a front elevational view of a computer system that is suitable for implementing various embodiments of the systems disclosed in FIGS. 3, 5, and 7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system for generating an image of an automobile. The system can include one or more processors and one or more non-transitory computer-readable storage devices. The one or more non-transitory computer-readable storage devices can store computing instructions. The computing instructions can be configured to communicate with the one or more processors and cause the one or more processors to perform operations. The operations can include generating an artificial surface for a 3D model of the automobile. The operations can further comprise blending the artificial surface for the 3D model of the automobile with a real-world surface of the automobile to create a blended surface that comprises both the artificial surface and the real-world surface. The operations can further comprise generating the image of the automobile. The image can include the blended surface.

Various embodiments include a method for generating an image of an automobile. The method can include generating an artificial surface for a 3D model of the automobile. The method can further comprise blending the artificial surface for the 3D model of the automobile with a real-world surface of the automobile to create a blended surface that comprises both the artificial surface and the real-world surface. The method can further comprise generating the image of the automobile. The image can include the blended surface.

Various embodiments can include an article of manufacture for generating an image of an automobile. The article of manufacture can include a non-transitory, tangible computer readable storage medium. The non-transitory, tangible computer readable storage medium can store instructions that, in response to execution by a computer, cause the computer to perform operations. The operations can include generating an artificial surface for a 3D model of the automobile. The operations can further comprise blending the artificial surface for the 3D model of the automobile with a real-world surface of the automobile to create a blended surface that comprises both the artificial surface and the real-world surface. The operations can further comprise generating the image of the automobile. The image can include the blended surface.

A number of embodiments can include a system. The system can include one or more processors and one or more non-transitory computer-readable storage devices storing computing instructions. The computing instructions can be configured to run on the one or more processors and perform generating a mask of an object using one or more images; generating a 3D model of the object using the mask of the object; simulating an artificial 3D capture environment; generating an artificial surface for the object in the artificial 3D capture environment; transferring the artificial surface for the object to the one or more images; and blending the artificial surface for the object with a real-world surface in the one or more images.

Various embodiments include a method. The method can be implemented via execution of computing instructions configured to run at one or more processors and configured to be stored at non-transitory computer-readable media The method can comprise generating a mask of an object using one or more images; generating a 3D model of the object using the mask of the object; simulating an artificial 3D capture environment; generating an artificial surface for the object in the artificial 3D capture environment; transferring the artificial surface for the object to the one or more images; and blending the artificial surface for the object with a real-world surface in the one or more images.

A number of embodiments can include a system. The system can include one or more processors and one or more non-transitory computer-readable storage devices storing computing instructions. The computing instructions can be configured to run on the one or more processors and perform generating a mask of an object using one or more images; generating a 3D model of the object using the mask of the object; facilitating displaying a 3D display of the object on an electronic device of a user using the 3D model; receiving, from the electronic device of the user, a zoom selection on the 3D display of the object; in response to receiving the zoom selection, facilitating displaying a zoomed 3D display of the object on the electronic device of the user; receiving, from the electronic device of the user, a zoom rotation selection of the object in the zoomed 3D display; and in response to receiving the zoom rotation selection, facilitating rotating the 3D display of the object in the zoomed 3D display on the electronic device of the user.

Various embodiments include a method. The method can be implemented via execution of computing instructions configured to run at one or more processors and configured to be stored at non-transitory computer-readable media The method can comprise generating a mask of an object using one or more images; generating a 3D model of the object using the mask of the object; facilitating displaying a 3D display of the object on an electronic device of a user using the 3D model; receiving, from the electronic device of the user, a zoom selection on the 3D display of the object; in response to receiving the zoom selection, facilitating displaying a zoomed 3D display of the object on the electronic device of the user; receiving, from the electronic device of the user, a zoom rotation selection of the object in the zoomed 3D display; and in response to receiving the zoom rotation selection, facilitating rotating the 3D display of the object in the zoomed 3D display on the electronic device of the user.

Figure 2:
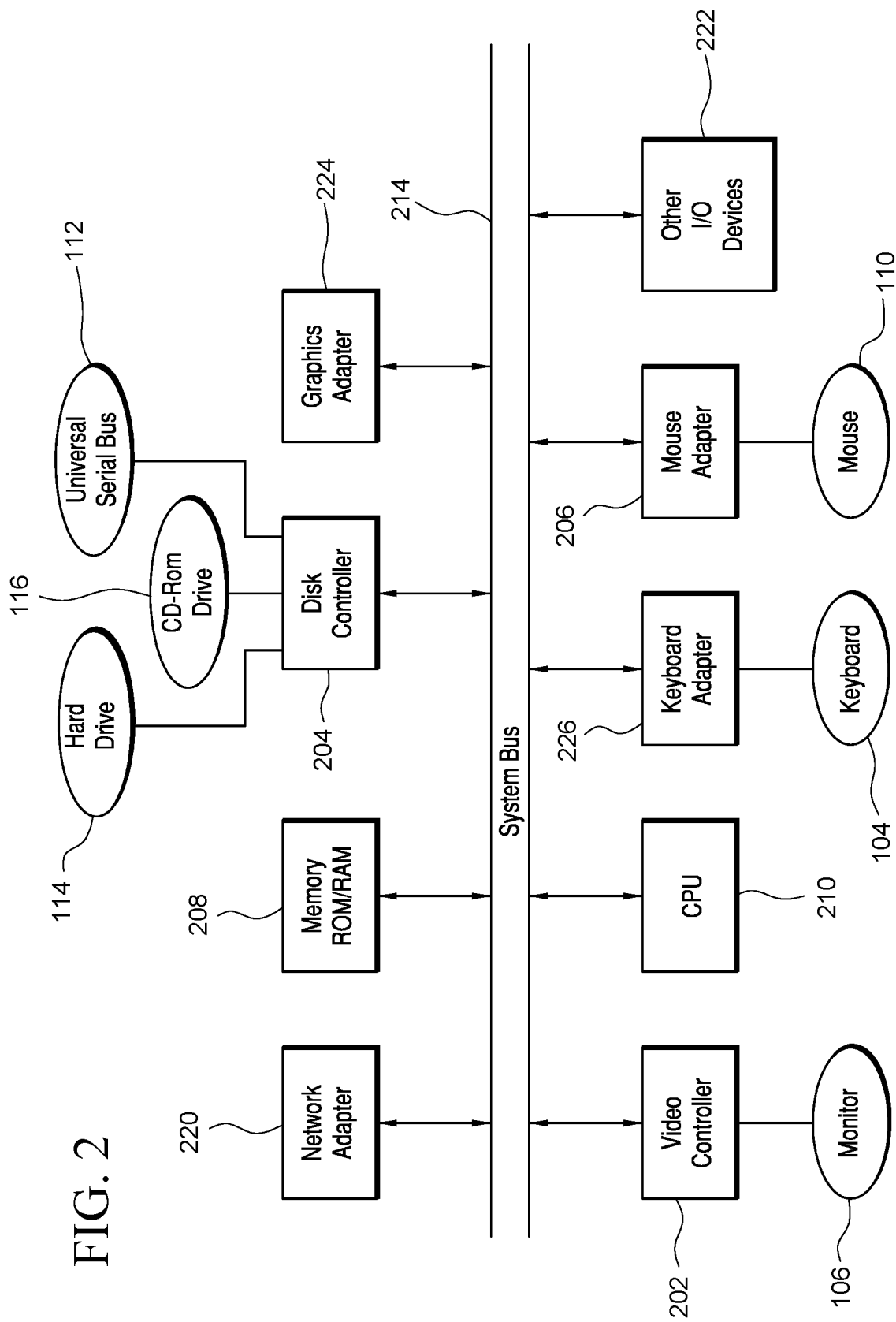
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
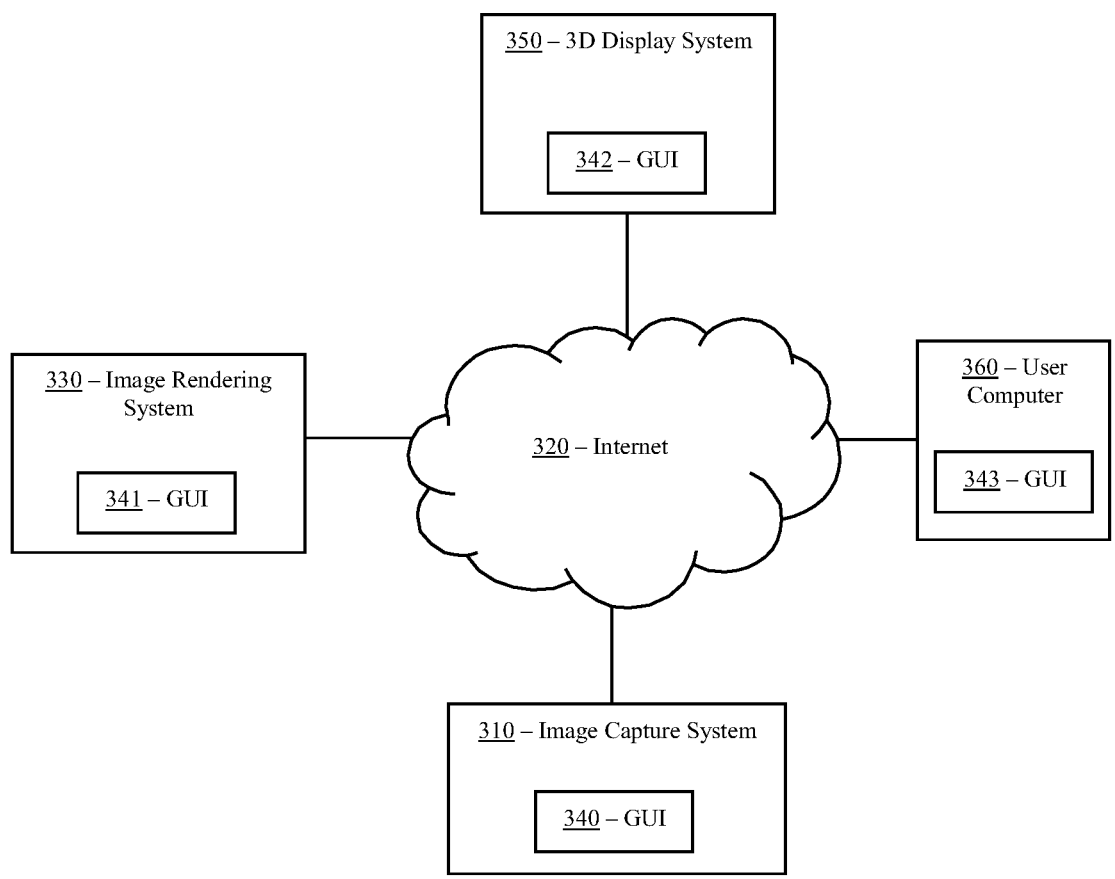
FIG. 3 illustrates a representative block diagram of a system, according to an embodiment.

Turning ahead in the drawings, FIG. 3 illustrates a block diagram of a system 300 that can be employed for rendering a portion of a 3D display, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an image capture system 310, an image rendering system 330, a 3D display system 350, and/or a user computer 360. Image capture system 310, image rendering system 330, 3D display system 350, and/or user computer 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of image capture system 310, image rendering system 330, 3D display system 350, and/or user computer 360. Additional details regarding image capture system 310, image rendering system 330, 3D display system 350, and/or user computer 360 are described herein.

In various embodiments, each of image capture system 310, image rendering system 330, 3D display system 350, and user computer 360 can be a separate system, such as computer system 100 (FIG. 1). In other embodiments, or two or more of image capture system 310, image rendering system 330, 3D display system 350, and user computer 360 can be combined into a single system, such as computer system 100 (FIG. 1). In any of the embodiments described in this paragraph, each separate system can be operated by a different entity or by a single entity, or two or more of each separate system can be operated by the same entity.

As noted above, in many embodiments, system 300 comprises user computer 360. In other embodiments, user computer 360 is external to system 300. User computer 360 can comprise any of the elements described in relation to computer system 100 (FIG. 1). In some embodiments, user computer 360 can be a mobile electronic device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 340-343. In the same or different embodiments, GUI 340-343 can be part of and/or displayed by image capture system 310, image rendering system 330, 3D display system 350, and/or user computer 360, and also can be part of system 300. In some embodiments, GUI 340-343 can comprise text and/or graphics (image) based user interfaces. In the same or different embodiments, GUI 340-343 can comprise a heads up display ("HUD"). When GUI 340-343 comprises a HUD, GUI 340-343 can be projected onto glass or plastic, displayed in midair as a hologram, or displayed on a display (e.g., monitor 106 (FIG. 1)). In various embodiments, GUI 340-343 can be color, black and white, and/or greyscale. In many embodiments, GUI 340-343 can comprise an application running on a computer system, such as computer system 100 (FIG. 1), image capture system 310, image rendering system 330, 3D display system 350, and/or user computer 360. In the same or different embodiments, GUI 340-343 can comprise a website accessed through internet 320. In some embodiments, GUI 340-343 can comprise an eCommerce website. In these or other embodiments, GUI 340-342 can comprise an administrative (e.g., back end) GUI allowing an administrator to modify and/or change one or more settings in system 300 while GUI 343 can comprise a consumer facing (e.g., a front end) GUI. In the same or different embodiments, GUI 340-343 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, image capture system 310, image rendering system 330, 3D display system 350, and/or user computer 360 can be in data communication through internet 320 with each other and/or with user computer 360. In certain embodiments, as noted above, user computer 360 can be desktop computers, laptop computers, smart phones, tablet devices, and/or other endpoint devices. Image capture system 310, image rendering system 330, and/or 3D display system 350 can host one or more websites. For example, 3D display system 350 can host an eCommerce website that allows users to browse and/or search for products, to add products to an electronic shopping cart, and/or to purchase products, in addition to other suitable activities.

In many embodiments, image capture system 310, image rendering system 330, 3D display system 350, and/or user computer 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) image capture system 310, image rendering system 330, 3D display system 350, and/or user computer 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of image capture system 310, image rendering system 330, 3D display system 350, and/or user computer 360. In a similar manner, the processing module(s) and the memory storage module(s) can be local and/or remote to each other.

As noted above, in many embodiments, image capture system 310, image rendering system 330, 3D display system 350, and/or user computer 360 can be configured to communicate with user computer 360. In some embodiments, user computer 360 also can be referred to as customer computers. In some embodiments, image capture system 310, image rendering system 330, 3D display system 350, and/or user computer 360 can communicate or interface (e.g., interact) with one or more customer computers (such as user computer 360) through a network or internet 320. Internet 320 can be an intranet that is not open to the public. In further embodiments, Internet 330 can be a mesh network of individual systems. Accordingly, in many embodiments, image capture system 310, image rendering system 330, and/or 3D display system 350 (and/or the software used by such systems) can refer to a back end of system 300 operated by an operator and/or administrator of system 300, and user computer 360 (and/or the software used by such systems) can refer to a front end of system 300 used by one or more users. In these embodiments, the components of the back end of system 300 can communicate with each other on a different network than the network used for communication between the back end of system 300 and the front end of system 300. In some embodiments, the users of the front end of system 300 can also be referred to as customers, in which case, user computer 360 can be referred to as a customer computer. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, image capture system 310, image rendering system 330, 3D display system 350, and/or user computer 360 also can be configured to communicate with one or more databases. The one or more databases can comprise a product database that contains information about products, items, automobiles, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between image capture system 310, image rendering system 330, 3D display system 350, and/or user computer 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for automated generation of surfaces in 3D displays. These techniques described herein can provide a significant improvement over conventional approaches of generating surfaces in 3D displays, such as manual generation of surfaces by a graphic artist. In many embodiments, the techniques described herein can beneficially generate surfaces in 3D displays based on dynamic information. For example, the techniques described herein can be used to generate bespoke surfaces for different types of objects in an automated workflow. In this way, these techniques can avoid problems with inconsistent generation of surfaces by a graphic artist.

In many embodiments, the techniques described herein can be used continuously at a scale that cannot be reasonably performed using manual techniques or the human mind. For example, these techniques can be implemented in an automated workflow that allows surfaces in multiple 3D displays to be generated in series. In addition, in some embodiments, surfaces in multiple 3D displays can be generated at the same time using a distributed processing system.

In a number of embodiments, the techniques described herein can solve a technical problem that arises only within the realm of computer networks, as 3D displays do not exist outside the realm of computer networks.

Figure 4:
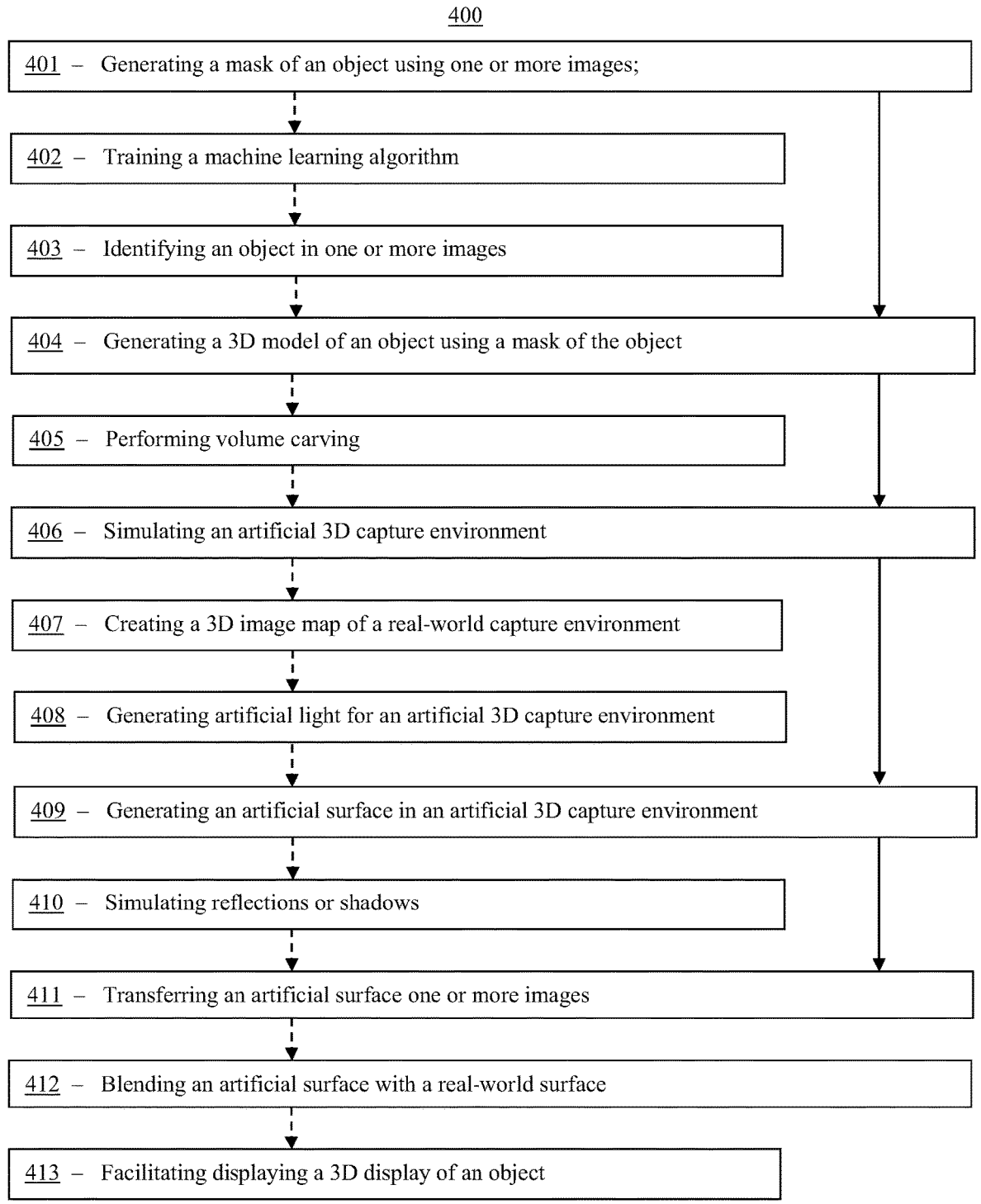
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as image capture system 310, image rendering system 330, 3D display system 350, and/or user computer 360 (FIG. 3). The processing module(s) can be similar or identical to the processing module(s) described above with respect to computer system 100 (FIG. 1).

In many embodiments, method 400 can comprise an activity 401 of generating a mask of an object using one or more images. In some embodiments, one or more images can be of one or more objects (e.g., an automobile). In these or other embodiments, the one or more objects can be a subject or a part of a 3D display, as described in further detail below. In various embodiments, one or more images can be taken in a real-world capture environment. In these or other embodiments, a real-world capture environment can comprise a 3D scanner. For example, an EinScan SE Desktop 3D Scanner, an Afinia EinScan-Pro 2× PLUS Handheld 3D Scanner, and/or an EinScan-SE White Light Desktop 3D Scanner can be used. In these or other embodiments, a 3D scanner can comprise a photography studio configured to create 3D displays. For example, application Ser. Nos. 15/834,374 and 16/404,335, which are incorporated herein by this reference in their entirety, describes a representative photography studio configured to create 3D displays. In many embodiments, a 3D scanner can comprise a stage where an object to be scanned is placed. In various embodiments, the stage can be located in an interior chamber of a 3D scanner. In these or other embodiments, a stage can be placed in approximately a center of an interior chamber of a 3D scanner. In some embodiments, an interior chamber of a 3D scanner can be configured to generate uniform lighting onto a stage. In some embodiments, one or more images can be taken in other real-world capture environments that are not a 3D scanner. For example, the one or more images can be taken outside or in a building using a handheld camera, a smartphone, a wearable electronic device, and/or some other portable electronic device outfitted with an image sensor. In many embodiments, a 3D scanner can be a part of and/or controlled by image capture system 310 (FIG. 3).

In many embodiments, one or more images can be taken radially around (e.g., around a central axis) an object. In this way, the one or more images can be of the one or more objects from multiple angles, thereby giving a 360 degree view around the one or more objects when combined. In embodiments where a 3D scanner is used, various techniques can be used to obtain radially captured images. For example, one or more cameras can be mounted to a rail along the circumference of an interior chamber, and these cameras can then be driven around the object while taking photographs. As another example, a stage of a 3D scanner can be configured to rotate while one or more cameras mounted at fixed positions take photographs. In embodiments where a portable electronic device is used to take the one or more images, a user of the portable electronic device can be instructed by a software application stored on the portable electronic device to walk around an object while taking pictures.

In various embodiments, each image of the one or more images can be associated with metadata identifying the position of a camera that took the image. For example, sensor data (e.g., gyroscope data, accelerometer data, compass data, global positioning system ("GPS") data) or augmented reality data (e.g., structure-from-motion data) can be included in image metadata. In many embodiments, image metadata can be used to identify value for a camera's six degrees of freedom (e.g, forward/back, up/down, left/right, yaw, pitch, roll). In embodiments where a 3D scanner is used, this positional information can be known in advance (e.g., by preconfiguring a camera's position) or computed by the 3D scanner while it is scanning the object. In embodiments where a portable electronic device is used, one or more location tracking modules (e.g., accelerometers, Bluetooth beacons, Wi-Fi location scanning, GPS, etc.) can be used to determine a position of the portable electronic device. In this way, each image of the one or more images (and any mask created from these images) can be oriented about the object. In some embodiments, one or more images can be received from an image capture system 310 (FIG. 3). In these or other embodiments, an image capture system 310 (FIG. 3) can be a part of and/or integrated with a 3D scanner, as described above. In various embodiments, image capture system 310 (FIG. 3) can comprise a software application installed on a computer system (e.g., system 100).

In many embodiments, a mask of an object can comprise a multidimensional mask of an object. In some embodiments, a mask can comprise a two dimensional ("2D") mask of an object. In some of these 2D embodiments, a mask of an object can comprise one or more black and white images of an object and/or a 2D vector representation of an object.

In embodiments where more than two dimensions are used, a mask can comprise one or more greyscale images, one or more color images, or one or more data storage formats with a multidimensional information format (e.g., a multidimensional vector). In these or other embodiments, a mask can be created from one or more images taken using a 3D scanner. In some embodiments, the one or more images are converted into a 2D format to create the mask. In various embodiments, an image segmentation algorithm can be used to create a mask. For example, an image thresholding algorithm, a clustering algorithm (e.g., k-means, super pixels, optical flow based segmentation, etc.), an edge detection algorithm (e.g., Canny, Sobel, etc.), or a predictive algorithm (e.g., machine learning, neural networks, etc.) can all be used in whole or in part. In some embodiments, one portion of a mask of an object can be labeled the object, and a different portion of the mask of the object can be labeled not the object. In many embodiments, a grayscale or color mask can be converted into a black and white mask using an image thresholding algorithm. In these embodiments, pixels with an intensity value above a predetermined intensity value (e.g, 128) are converted to white pixels while pixels below the predetermined intensity value are converted to black (or vice versa).

In some embodiments, a respective mask of an object can be generated for each of one or more images taken by a 3D scanner. In embodiments where the one or more images are taken radially around the object, the mask can be considered a rough (e.g., low dimensional) model of the object as seen from the angle the image was taken. This low dimensionality can be advantageous for many reasons due to the speed at which it can be processed by a computer system running complex, processor intensive algorithms (e.g., machine learning algorithms, computer vision algorithms, and/or 3D modeling algorithms). In many embodiments, a bounding box placed around an object, and this bounding box can be used to crop one or more images (or one or more masks created from the one or more images). In this way, processing times and burdens on a processor can be further reduced because less image data is used. When masks for multiple angles are combined using metadata identifying the position of the camera, a rough 3D model of an object can be created, as described in further detail below.

In many embodiments, method 400 can optionally comprise an activity 402 of training a machine learning (e.g., predictive) algorithm. In many embodiments, activity 402 can be performed at the same time or as a part of activity 401 and/or activity 403. In some embodiments, one or more of activities 401, 402, and 403 can be performed separately. In various embodiments, training a machine learning algorithm can comprise estimating internal parameters of a probabilistic model. In many embodiments, a probabilistic model can be configured to identify one or more objects shown in one or more images. In some embodiments, a probabilistic model can determine a probability that each pixel (or groups of pixels) in an image correspond to one or more objects. In various embodiments, a machine learning algorithm can be trained using labeled training data, otherwise known as a training dataset. In many embodiments, a training dataset can comprise one or more training images. In some embodiments, one or more training images can comprise labeled images of one or more objects. In these or other embodiments, the labeled images of the one or more objects can have been taken using a 3D scanner in one or more real-world capture environments, as described above. In some embodiments, a bounding box can be placed around an object in the one or more labeled images, and this bounding box can be used to crop the one or more labeled images to a lower resolution. These lower resolution images can be used to train a machine learning algorithm faster on systems with low processing power (e.g., on portable or wearable electronic devices).

In various embodiments, one or more labels for one or more training images in a training dataset can comprise "object" and "not object" (e.g., "car" and "not car"). Additional labels can be used to further refine machine learning algorithms and/or to create bespoke machine learning algorithms to identify a variety of objects. In many embodiments, the labels can comprise various specifications for an object or distinguishing characteristics of the object. For example, a car's make, model, year, or body type (e.g., truck, SUV, van, sedan, etc.) can be used as labels. In the same or other embodiments, parts or sub parts of an object can be used as labels. For example, mirror, door, wheel, antenna, spoiler, hood, etc. can be used as labels. In various embodiments, staging or positioning of an object in the real world capture environment can be used as a label. For example, doors open, trunk closed, hood open, on an incline, etc. can be used as labels. In these or other embodiments, a cleanliness level of an object or a surface in the real-world capture environment can be used as a label. In these embodiments, cleanliness can refer to a level of dirt, grime, liquid, or other photographically deleterious elements present in an image. For example, cleanliness of one or more surfaces (e.g., a floor, walls, or background in the real-world capture environment) can be measured on a bucketed or sliding scale and used as a label. In various embodiments, various physical based rendering ("PBR") characteristics of surfaces in the real world capture environment can be used as labels. For example, diffuse color, roughness, specularity, and/or metalness can be used as labels. In various embodiments, a "metalness" characteristic can be set to zero to reduce glare and reflections in a 3D display. In many embodiments, labels and their respective values can be chosen manually by an administrator of all or a part of system 300 (FIG. 3)

In the same or different embodiments, a pre-trained machine learning algorithm can be used, and the pre-trained algorithm can be re-trained on the labeled training data. In some embodiments, the machine learning model can also consider both historical and real time input of labeled training data. In this way, a machine learning algorithm can be trained iteratively as labeled training data is added to a training data set. In many embodiments, a machine learning algorithm can be iteratively trained in real time as data is added to a training data set. In various embodiments, a machine learning algorithm can be trained, at least in part, on a single object's (or class/subclass of objects') labeled training data or a single object's (or class/subclass of objects') labeled training data can be weighted in a training data set. In this way, a machine learning algorithm tailored to an object (or class/subclass of objects) can be generated. In the same or different embodiments, a machine learning algorithm tailored to a single object can be used as a pre-trained algorithm for a similar object. For example, if only images of trucks are in the labeled training data, then a machine learning algorithm can be configured to identify trucks in one or more images.

In many embodiments, a machine learning algorithm can comprise a neural network. In these or other embodiments, a neural network can comprise one or more nodes connected by one or more edges. In some embodiments, the nodes can be organized into one or more layers. In this way, signals can be passed through the neural network between the one or more layers. In various embodiments, the one or more layers can be fully connected (e.g., each node in a layer is connected to all nodes in the next layer). In other embodiments, there is local connectivity in the neural network (e.g., only some nodes are connected to each other). In some embodiments, a network can comprise a convolutional neural network ("CNN"). In many embodiments, a CNN can comprise a neural network having at least one convolutional layer. In many embodiments, each node has a rectifier that can be used to determine when it propagates its signal. For example, a rectifier can comprise a non-linear equation (e.g., logistic) or a linear equation. As another example, a rectifier can comprise a piecewise function having one or more linear and/or non-linear portions. In various embodiments, all or a portion of a pre-designed neural network can be used. In many embodiments, the pre-designed neural network can be configured to segment and/or label images. For example, a U-Net CNN can be used. Further details on U-Net CNNs can be found in Ronneberger et al., U-Net: Convolutional Networks for Biomedical Image Segmentation, International Conference on Medical Image Computing and Computer-Assisted Intervention 234 (2015), which is herein incorporated by reference in its entirety.

In many embodiments, method 400 can comprise an activity 403 of identifying an object in one or more images. As an example, activity 403 can be automated to not require human interaction or intervention. In many embodiments, activity 403 can be performed at the same time or as a part of activity 401 and/or activity 402. In some embodiments, one or more of activities 401, 402, and 403 can be performed separately. In various embodiments, a trained machine learning algorithm (e.g., a trained neural network) can be configured to identify one or more objects in one or more images. In these or other embodiments, a machine learning algorithm can identify an object using one or more masks of an object. In the same or different embodiments, a machine learning algorithm can comprise a classifier configured (e.g., trained) to identify an object in one or more images. In some embodiments, a classifier can be a binary classifier or a multi-class classifier. In these or other embodiments, a neural network can be configured to act as a classifier (e.g., to identify one or more objects in one or more images), as described above.

In many embodiments, method 400 can comprise an activity 404 of generating a 3D model of an object using a mask of the object. As an example, activity 404 can be automated to not require human interaction or intervention. In various embodiments, a mask can comprise a list or set of coordinates identified as the object in one or more images. In some embodiments, these coordinates can correspond to pixels on the one or more images. In some embodiments, a 3D model of an object can comprise one or more voxels. In these embodiments, the 3D model can be referred to as a voxel model of the object or as having been "voxelized." In various embodiments, a mask and/or a 3D model can be stored in one or more databases hosted on one or more back end systems (e.g., of image capture system 310 (FIG. 3), image rendering system 330 (FIG. 3), and/or 3D display system 350 (FIG. 3)).

In some embodiments, activity 404 can further comprise an optional activity 405 of performing volume carving. In these embodiments, volume carving can be performed using one or more masks, as described in activities 401-403. In many embodiments, activity 405 can be performed at the same time or as a part of activity 404. In some embodiments, activities 404 and 405 can be performed separately. In many embodiments, configuration information (e.g., metadata identifying a position of a camera, as described above) from image capture system 310 (FIG. 3) can be used to create a unit circle around a set of voxels. In some embodiments, the unit circle can be normalized based on the configuration information (e.g., camera location, camera yaw, camera pitch, camera roll, etc.). In these embodiments, the masks are projected onto a set of voxels corresponding to their location on a unit circle, and voxels identified as "not object" by the projection are removed from the set of voxels. This removal can eliminate the "not object" from the to-be-generated mask such that only the object is used to generate the mask. In some embodiments, a set of voxels can be arranged into one or more polygons to define a resolution of a 3D display. For example, the set of voxels can comprise a 40×40×40 cube of voxels or a 200×200×200 cube of voxels. In various embodiments, volume carving can result in a list of coordinates identifying a set of voxels that are on the surface of or inside an object. In some embodiments, a voxel model can be described using a 3D coordinate system. In these or other embodiments, a voxel model can be stored in a database by storing a list of coordinates for the voxel model. In many embodiments, a voxel model can be modified using various post processing techniques. For example, a marching cube algorithm can be used to polygonize a voxel model or vertices of the voxel model can be merged. In this way, a voxel model can be smoothed before presentation to a user.

Using volume carving to create a 3D model can provide a number of advantages over traditionally automated methods of producing a 3D model. For example, when low dimension masks are used to volume carve, processing loads can be reduced to a point where 3D models can be quickly generated on mobile and wearable devices. This then allows a user with no 3D modeling or professional photography experience to generate a 3D model of an object by simply walking around the object. Further, using masks to train machine learning algorithms to identify objects instead of using more complex metrics (e.g., a loss function) improves automated 3D modeling of highly reflective surfaces (e.g., a freshly washed and waxed car). This is because more complex and processor intensive algorithms for automatically identifying objects in images tend to incorrectly identify reflections as features on the object. These incorrect features then introduce error into the model as they are tracked around an object while at same time appearing on different parts of the object.

In many embodiments, method 400 can comprise an activity 406 of simulating an artificial 3D capture environment. In various embodiments, activity 406 can be performed before, at the same time as, or after activities 401-405. In these or other embodiments, an artificial 3D capture environment can comprise a 3D rendering of a real world capture environment. For example, the artificial 3D capture environment can approximate or simulate the color, lighting, shape, etc. of the real world capture environment. In some embodiments, an artificial 3D capture environment can be pre-rendered for a corresponding real world capture environment. In this way, a 3D display can be quickly and/or efficiently displayed on systems with low processing power (e.g., on portable or wearable electronic devices) by calling the artificial 3D capture environment from its storage location (e.g., image capture system 310 (FIG. 3), image rendering system 330 (FIG. 3), 3D display system 350 (FIG. 3), and/or user computer 360 (FIG. 3)) instead of rendering the artificial 3D capture environment on the fly. In various embodiments, an artificial 3D capture environment can be generated as a composite of multiple real world capture environments. In this way, slight differences in the interior of each 3D scanner can be "rounded out" to create a more uniform setting for 3D displays.

In many embodiments, method 400 can optionally comprise an activity 407 of creating a 3D image map of a real-world capture environment. In some embodiments, activity 407 can be performed as a part of or totally separate from activity 406. In various embodiments, a 3D image map of a real-world capture environment can be made by taking instrument readings (e.g., luminosity, reflectivity, etc.) at known points in the real world capture environment. In these or other embodiments, instrument readings from a plurality of real world capture environments can be averaged to create a composite artificial 3D capture environment. In some embodiments, outlier measurements from instrumental readings can be removed to create a uniform artificial 3D capture environment. In many embodiments, a 3D image map can be created by performing a "blank" or "control" scan. For example, a 3D image map can be created by running the 3D scanner and/or image capture system 310 (FIG. 3) with no object. In various embodiments, a specialized camera can be used to perform a "blank" or "control" scan. For example, a Ricoh Theta SC2 Camera can be used to perform a "blank" or "control" scan of a real world capture environment.

In many embodiments, method 400 can optionally comprise an activity 408 of generating artificial light for an artificial 3D capture environment. In some embodiments, activity 408 can be performed as a part of activity 406 or 407 Activity 408 can also be performed after activity 406 or 407. In various embodiments, artificial light can be generated by performing path tracing using a 3D image map. Path tracing is a Monte Carlo method of rendering images of 3D environments such that the illumination is faithful to reality. More information about path tracing can be found in PHARR ET AL., PHYSICALLY BASED RENDERING: FROM THEORY TO IMPLEMENTATION (3d ed. 2016), available at http://www.pbr-book.org/, which is hereby incorporated by this reference in its entirety. In some embodiments, a path tracing render can be performed using instrument readings in a 3D image map. For example, if luminosity is known at each point on a 3D image map, then rays of light having that luminosity can be simulated from that point in an artificial 3D capture environment using the path tracing render. In this way, a virtual 3D display studio can be created that resembles a real world capture environment. Further, when the virtual display studio uses a 3D image map of a 3D scanner, 3D displays of objects shown in the 3D scanner can be generated for objects that have not been scanned in it. For example, when one or more images are taken using a portable electronic device in other real world capture environments, the techniques described herein can create a bespoke model of the object as it would be displayed in the 3D scanner. In this way, users with little to no photography or graphic design experience can generate bespoke, uniformly lit 3D displays of objects shown in a 3D scanner.

In many embodiments, method 400 can further comprise an activity 409 of generating an artificial surface in an artificial capture environment. In some embodiments, activity 409 can be performed as a part of or at the same time as one or more of activities 406-408. In various embodiments, a bespoke artificial surface can be generated for an object scanned in a 3D scanner. In these or other embodiments, an artificial surface can be generated using artificial light generated in activity 408, but other sources of artificial light can also be used. In various embodiments, physical based rendering properties of a surface shown in one or more images can be known or measured, and these properties can be used to generate an artificial surface that has similar or the same photographic properties as the surface. In many embodiments, an artificial surface can be rendered as it would be displayed if present in an artificial 3D environment using these physical based rendering properties and artificial light. In many embodiments, activity 409 can comprise creating a surface model. In these or other embodiments, a surface model can have one or more pre-set surface properties (e.g. PBR properties as described above). In various embodiments, a 3D model of an object (e.g., as described in one or more of activities 404-405) can be placed on a surface model. After a 3D model of an object is placed on a surface model, path tracing can be performed to generate an artificial surface. In this way, light rays occluded by the object can be simulated in an artificial capture environment.

In many embodiments, activity 409 can be performed without performing all of activity 408 (e.g., without generating artificial light for an entire an artificial capture environment). In these embodiments, artificial light can be generated for only a surface of interest. In this way, processing times and burdens can be reduced for a 3D display because only certain surfaces will need to be rendered. In some embodiments, this reduction of processing times and burdens allows a 3D display to be generated entirely on a portable electronic device. Further, for surfaces that are not the focal point of the 3D display (e.g, a stage or a wall in the background), a lower resolution render can be generated to further save on processing time while still maintaining high real world fidelity. For example, a low resolution render can comprise a one quarter resolution image as compared to images captured in a 3D scanner. As another example, a lower resolution render can have one sixteenth of a number of pixels as compared to images captured in a 3D scanner. In many embodiments, lower resolution renders can be used in areas with low-frequency details (e.g., where pixel values are changing at a low rate) and high resolution renders can be used in areas with high-frequency details (e.g., where pixel values are changing at a high rate). In various embodiments, areas where an object contacts an artificial surface can have high frequency details. For example, when an artificial surface comprises an artificial floor, areas where an object contacts the artificial floor can have a rapidly changing shadow with high-frequency details. In these embodiments, time and computing power used for the path tracing render can be saved by performing the render at a lower resolution and then supersampling a higher resolution image when generating an artificial surface. In many embodiments, supersampling can comprise rendering a high resolution shadow and then determining its frequency of decomposition (e.g., by using a 2D Fourier transform) to set an upper bound of its detail frequency. In various embodiments, an upper bound of a shadow's detail frequency can then be used to set a detail frequency for an artificial surface rendered at display resolution.

In many embodiments, method 400 can optionally comprise an activity 410 of simulating reflections or shadows. In some embodiments, activity 410 can be performed as a part of or at the same time as activity 409. In many embodiments, reflections or shadows can be simulated onto an artificial surface generated in activity 409. In these or other embodiments, a voxelized model of an object can be used to simulate the object's reflections or shadows. In these embodiments, physical based rendering properties of the object can be used in combination with path trace rendering to generate bespoke reflections or shadows for the object.

In many embodiments, method 400 can comprise an activity 411 of transferring an artificial surface to one or more images. In some embodiments, the one or more images can be images taken using a 3D scanner or a portable electronic device, as described above. In other embodiments, the one or more images can be renderings of an object as displayed in an artificial capture environment. In some embodiments, an artificial surface can be oriented in one or more images using a horizon line identified in both the artificial surface and the one or more images. In these embodiments, the horizon lines can be aligned, and the artificial surface can be oriented the same as its corresponding real-world surface in the one or more images.

In many embodiments, method 400 can further comprise an activity 412 of blending an artificial surface with a real-world surface. In these or other embodiments, an artificial surface can be blended with a real-world surface in one or more images. In many embodiments, a compositor render node chain can be used to blend an artificial surface with a real world surface. In these or other embodiments, various properties of a real-world surface or an artificial surface can be modulated when blending the two. For example, an amount of reflection off of an object, an object shadow opacity, or a surface cleanliness level can be modulated. Blending an artificial surface with a real-world surface can provide a number of advantages over merely substituting the artificial surface for the real-world surface. For example, blending the surfaces allows for an augmented reality 3D display that looks more realistic while still being able to uniform in its composition for different objects. Further, blending these two surfaces can reduce downtime for a 3D scanner by delaying maintenance. For example, blending allows for a stage of a 3D scanner to be cleaned less often because a dirty real-world stage can be blended with a clean, artificial render of a stage generated from its 3D image map. This can then be used to create a 3D display where the stage for the object is neither distractingly dirty nor distractingly artificial.

In many embodiments, method 400 can comprise an activity 413 of facilitating displaying a 3D display of an object. In various embodiments, a 3D display can be generated using one or more images of an object created in any of the previous steps. For example, one or more images having a blended surface can be used to generate a 3D display. Many techniques exist for generating a 3D display from one or more images of an object. For example, U.S. Pat. Nos. 9,412,203, 9,996,663, 10,284,794, and 10,423,995, which are all incorporated herein by this reference in their entirety, describe systems and methods for generating 3D displays. In many embodiments, a 3D display can iterate through one or more images of an object as a user navigates around the 3D display. In these or other embodiments, one or more images of an object can be used as textures for a 3D model of an object. In these embodiments, when a user stops the 3D model on a view in-between the one or more images, the 3D display can be automatically navigated to a closest image of the one or more images. In various embodiments, automatic navigation can be in a direction of navigation selected by the user. For example, if a user is rotating clockwise, then the automatic navigation can be to a next image in a clockwise direction. In these or other embodiments, automatic navigation can comprise a faster navigation than user selected navigation.

Figure 5:
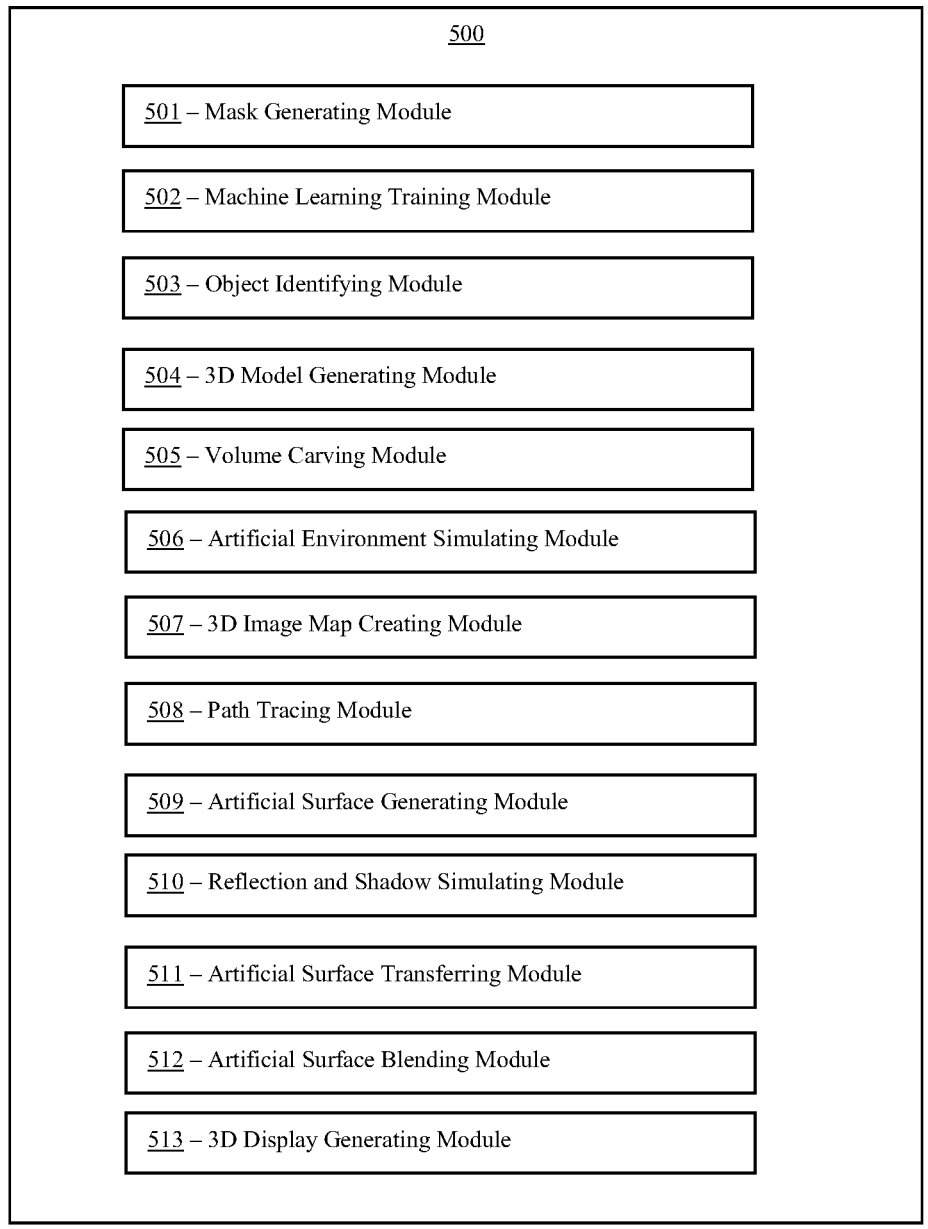
FIG. 5 illustrates a representative block diagram of a system, according to an embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as mask generating module 501. In many embodiments, mask generating module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as machine learning training module 502. In many embodiments, machine learning training module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as object identifying module 503. In many embodiments, object identifying module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as 3D model generating module 504. In many embodiments, 3D model generating module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as volume carving module 505. In many embodiments, volume carving module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as artificial environment simulating module 506. In many embodiments, artificial environment simulating module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as 3D image map creating module 507. In many embodiments, 3D image map creating module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as path tracing module 508. In many embodiments, path tracing module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as artificial surface generating module 509. In many embodiments, artificial surface generating module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as reflection and shadow simulating module 510. In many embodiments, reflection and shadow simulating module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as artificial surface transferring module 511. In many embodiments, artificial surface transferring module 511 can store computing instructions configured to run on one or more processing modules and perform one or more acts of method 400 (FIG. 4) (e.g., activity 411 (FIG. 4)).

In many embodiments, system 500 can comprise non-transitory memory storage module 512. Memory storage module 512 can be referred to as artificial surface blending module 512. In many embodiments, artificial surface blending module 512 can store computing instructions configured to run on one or more processing modules and perform one or more acts of method 400 (FIG. 4) (e.g., activity 412 (FIG. 4)).

In many embodiments, system 500 can comprise non-transitory memory storage module 513. Memory storage module 513 can be referred to as 3D display generating module 513. In many embodiments, 3D display generating module 513 can store computing instructions configured to run on one or more processing modules and perform one or more acts of method 400 (FIG. 4) (e.g., activity 413 (FIG. 4)).

Figure 6:
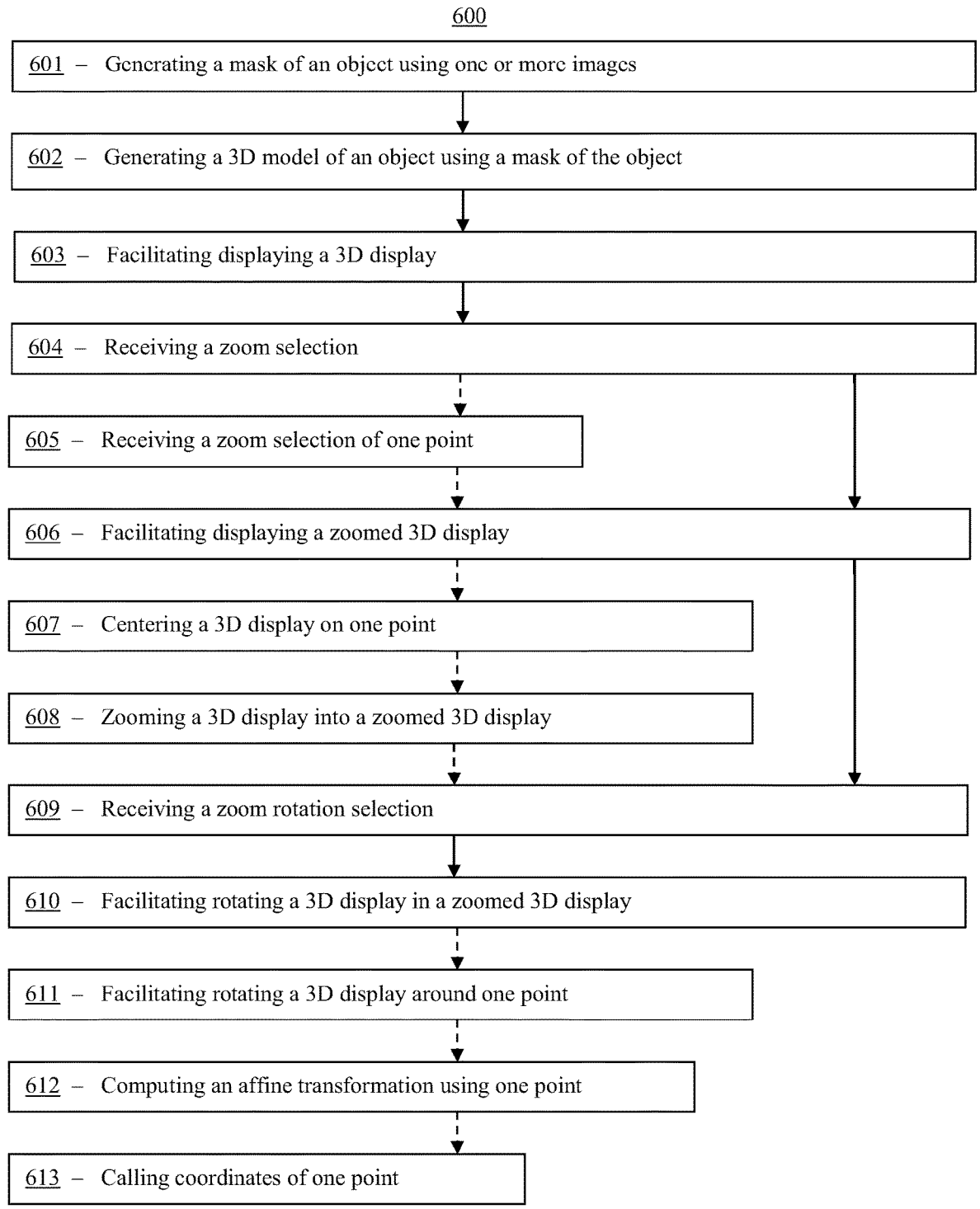
FIG. 6 illustrates a flowchart for a method, according to certain embodiments.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as image capture system 310 (FIG. 3), image rendering system 330 (FIG. 3), 3D display system 350 (FIG. 3), and/or user computer 360 (FIG. 3). The processing module(s) can be similar or identical to the processing module(s) described above with respect to computer system 100 (FIG. 1). In some embodiments, method 600 can be performed in parallel, before, after, or as a part of method 400 (FIG. 4). In various embodiments, one or more activities of method 600 can be inserted into and/or combined with all of or portions of method 400 (FIG. 4).

In many embodiments, method 600 can comprise an activity 601 of generating a mask of an object using one or more images. In various embodiments, activity 601 can be similar to and/or incorporate one or more of activities 401-403 (FIG. 4). In some embodiments, all or a portion of activity 601 can be performed on a back end system (e.g., image capture system 310 (FIG. 3), image rendering system 330 (FIG. 3), and/or 3D display system 350 (FIG. 3)) and one or more subsequent activities can be performed on a front end system (e.g., user computer 360 (FIG. 3)). In this way, processor intensive calculations (e.g., generating a 3D augmented reality or virtual reality mask) that are ill suited for slower or lower quality systems (e.g., an end user's mobile device or personal computer) can be performed on a faster or higher quality system. It will be understood that a "faster" or "higher quality" system can be achieved in one or more of a number of ways. For example, a faster or higher quality system can have a larger memory storage device (e.g., hard disk drive, solid state drive, random access memory, cache, etc.), a faster memory storage device (e.g., hard disk drive as compared to a solid state drive), a faster processing device (e.g., single core as compared to multi core), use faster processing or transmission protocols (e.g., 4G vs 5G wireless protocols) and/or use a different type of computing technology (e.g., electronic computers as compared to optical computers or quantum computers).

In many embodiments, method 600 can comprise an activity 602 of generating a 3D model of an object using a mask of an object. In various embodiments, activity 602 can be similar to and/or incorporate one or more of activities 404-405 (FIG. 4). In some embodiments, all or a portion of activity 602 can be performed on a back end system (e.g., image capture system 310 (FIG. 3), image rendering system 330 (FIG. 3), and/or 3D display system 350 (FIG. 3)) and one or more subsequent activities can be performed on a front end system (e.g., user computer 360 (FIG. 3)). In this way, processor intensive calculations (e.g., generating a 3D augmented reality or virtual reality model) that are ill suited for slower or lower quality systems (e.g., an end user's mobile device or personal computer) can be performed on a faster or higher quality system.

In many embodiments, method 600 can comprise an activity 603 of facilitating displaying a 3D display of the object. The display can occur on an electronic device of a user using the 3D model. In various embodiments, activity 603 can be similar to and/or incorporate one or more of activities 406-413 (FIG. 4). In some embodiments, all or a portion of activity 603 can be performed on a back end system (e.g., image capture system 310 (FIG. 3), image rendering system 330 (FIG. 3), and/or 3D display system 350 (FIG. 3)) and one or more subsequent activities can be performed on a front end system (e.g., user computer 360 (FIG. 3)). In this way, processor intensive calculations (e.g., simulating an artificial 3D capture environment) that are ill suited for slower or lower quality systems (e.g., an end user's mobile device or personal computer) can be performed on a faster or higher quality system.

In many embodiments, method 600 can comprise an activity 604 of receiving a zoom selection. In various embodiments, a zoom selection can comprise an interaction with a GUI (e.g., an interaction with GUI 343). For example, a user can tap or click an area on a 3D display to zoom to that area. As other examples, a user on a touch screen device can use a pinch, a reverse pinch, or a drag to zoom to a point. As further examples, a user using a mouse, trackball or joystick can actuate one or more inputs on the mouse, trackball, or joystick to initiate a zoom (e.g., by performing movements that would click or move a cursor or by rolling a scroll wheel). As an additional example, a user can use a first interaction to select a zoom point or to enter a zoom mode on the GUI and then second interaction initiate the zoom (e.g., by clicking a point on a 3D display and then rolling a scroll wheel to zoom).

In many embodiments, method 600 can comprise an optional activity 605 of receiving a zoom selection of one point. In various embodiments, activity 605 can be performed as a part of or concurrently with activity 604. In some embodiments, a zoom selection can be made on a 3D display having a 2D coordinate system. For example, a 3D display shown on a display device (e.g., monitor 106 (FIG. 1) and/or screen 108 (FIG. 1)) can be described by a 2D coordinate system in the plane of the display device. In these embodiments, 2D coordinates of the zoom selection can be determined. For example, a software plugin (e.g., a JavaScript plugin or mobile application) running on a user device can determine the 2D coordinates of the selection. In various embodiments, 2D coordinates of a point selected in a zoom selection (i.e., a zoom selection point) can be included in the zoom selection when received. In other embodiments (e.g., when a zoom mode is entered before zooming), 2D coordinates of a point can be received after a zoom selection is made.

In many embodiments, method 600 can comprise an activity 606 of facilitating displaying a zoomed 3D display of the object. In various embodiments, a zoomed 3D display can comprise a 3D display that has been enlarged. In these or other embodiments, a zoomed 3D display can continue to render unseen portions of a 3D display or can crop out all or a portion of the unseen portions. In embodiments where the 3D display is cropped, burdens on a graphics processing device rendering the zoomed 3D display can be lessened, thereby leading to faster processing times. In a first set of examples, a 3D display can comprise different images than a zoomed 3D display. In this way, a 3D display can comprise lower resolution images of an object, and a zoomed 3D display can comprise higher resolutions images of the object. In a second set of examples, lower resolution images of an object can comprise higher resolution images of the object that have been compressed, stored in a different image file format (e.g., as a JPEG, a GIF, TIFF, BMP, etc.), and/or have a smaller storage size. In this way, transmission and/or processing times for displaying a 3D display can be lessened so that the 3D display can be created on a lower quality system or a system with lower computing power. In these or other embodiments, a zoomed 3D display can provide additional details about a 3D display that are either not shown or are smaller on the original 3D display. For example, a zoomed 3D display can show imperfections (scratches, dents, dings, etc.) or additional features (e.g., aftermarket additions or enhanced feature packages) of an object shown in a 3D display, where the original 3D display does not show such imperfections or shows fewer details of such imperfections.

In many embodiments, method 600 can comprise an optional activity 607 of centering a 3D display of the object on one point. In some embodiments, activity 607 can be performed as a part of or concurrently with activity 606 and/or activity 608. In these or other embodiments, a 3D display can be centered on a zoom selection point, as described above. In many embodiments, a translation operation can be performed so that a projection of a 3D point onto a camera plane matches one or more midpoint locations of a current height and width of the camera plane.

In many embodiments, method 600 can comprise an optional activity 608 of zooming a 3D display into a zoomed 3D display. In some embodiments, activity 608 can be performed as a part of or concurrently with activity 606 and/or activity 607. In these or other embodiments, zooming a 3D display into a zoomed 3D display can comprise immediately displaying (e.g., a hard cut to) the zoomed 3D display without a transition or animation. In various embodiments, zooming a 3D display into a zoomed 3D display can comprise one or more zoom animations (i.e., zoom transitions). In many embodiments, a zoom animation can comprise a fade in or out animation, a defocus and refocus animation, a dissolve animation, an iris animation, a wash animation, a wipe animation, a morph animation, or other types of scene transitions known in the art. In some embodiments, a zoom animation can comprise a smooth zoom animation into a zoomed 3D display from a 3D display. In these embodiments, a smooth zoom animation can be generated using one or more Bezier curves.

In many embodiments, method 600 can comprise an activity 609 of receiving a zoom rotation selection. In these or other embodiments, a zoom rotation selection can be configured to initiate rotation of a zoomed 3D display. In some embodiments, a zoom rotation selection can be a part of a zoom selection. For example, a zoomed 3D display can rotate automatically (e.g., without additional user input) after a zoom selection is received. In various embodiments, a zoom rotation selection can comprise an interaction with a GUI (e.g., an interaction with GUI 343). For example, a user can tap or click an area on a 3D zoomed model to rotate the zoomed 3D display. As other examples, a user on a touch screen device can use a pinch, a reverse pinch, or a drag to rotate a zoomed 3D display. As further examples, a user using a mouse, trackball or joystick can actuate one or more inputs on the mouse, trackball, or joystick to rotate a zoomed 3D display (e.g., by performing movements that would click or move a cursor or by rolling a scroll wheel). As an additional example, a user can use a first interaction to select a zoom rotation point or to enter a zoom rotation mode on the GUI and then a second interaction initiate the zoom rotation (e.g., by clicking a point on a 3D display and then rolling a scroll wheel to rotate). In many embodiments, a GUI can comprise a zoom rotation bar or slider. In these embodiments, interacting with the zoom rotation bar or slider can cause a zoomed 3D display to rotate.

In many embodiments, method 600 can comprise an activity 610 of facilitating rotating a 3D display in a zoomed 3D display. In various embodiments, rotating a 3D display in a zoomed 3D display can comprise transitioning from a first image of an object to a second image of an object in a sequence. For example, when a 3D display is generated using radially captured images, rotating a 3D display in a zoomed 3D display can comprise transitioning from a radially captured image in a sequence to a subsequent radially captured image in a sequence. In these or other embodiments, radially captured image can be concatenated into a video and rotating a 3D display in a zoomed 3D display can comprise playing all or a portion of the video.

In many embodiments, method 600 can comprise an optional activity 611 of facilitating rotating a 3D display around one point. In some embodiments, activity 611 can be performed as a part of or concurrently with activity 610 and/or one or more of activities 612-613. In various embodiments, rotating a 3D display around one point can comprise rotating a 3D display around a zoom selection point as described in activity 605. In these or other embodiments, rotating a 3D display around one point can comprise rotating a 3D display around a zoom rotation point. In various embodiments, a zoom rotation point can be the same or different than a zoom selection point as described above. When a zoom rotation point is different than a zoom selection point, 2D coordinates of a zoom rotation point can be determined as described above with reference to a zoom selection point in activity 605.

In many embodiments, method 600 can comprise an optional activity 612 of computing an affine transformation using one point. In some embodiments, activity 612 can be performed as a part of or concurrently with one or more of activities 610-611 and/or activity 613. Generally speaking, an affine transformation can comprise one or more algorithms configured to perform a geometric transformation on images in a sequence that preserves lines and parallelism between the images in the sequence. In embodiments where images are projected onto a 3D model, an affine transformation can comprise one or more algorithms configured to preserve lines and parallelism between images in a sequence as projected onto the 3D model. In other words, an affine transformation can be used to align and/or stabilize images in a sequence to create a smoothly rotating 3D display. In various embodiments, an affine transformation can be computed using a zoom selection point and/or a zoom rotation point. In some embodiments, 2D coordinates of a zoom selection point and/or a zoom rotation point can be used to identify an axis of rotation for a 3D model shown in and/or used to create a zoomed 3D display. In these embodiments, the 2D coordinates of the zoom selection point and/or the zoom rotation point can be projected onto the 3D model to determine 3D coordinates of the zoom selection point and/or the zoom rotation point. These 3D coordinates can then be set as an axis of rotation for a zoomed 3D display. In various embodiments, these 3D coordinates can then be used to align images projected onto a 3D model to create a zoomed rotation.

In many embodiments, an affine transformation can be computed using a 3D scene S comprising a 3-axis (X, Y, Z) coordinate frame. In these or other embodiments, Y can comprise a vertical axis. In various embodiments, a 3D scene can comprise at least one 3D point P=(x, y, z). In some embodiments, an affine transformation can operate on a set of images 1 mg={img$_1$, img$_2$, . . . , img$_N$} and each image can be associated with a respective camera in a set of cameras C={c$_1$, c$_2$, c$_N$} where N is a positive real number. In many embodiments, a second 3D point P' can be created from P by translating P on a Y axis by a Δy value (thereby defining P'=(x, y+Δy, z)). In some embodiments, a projection of P and P' can be computed in each image in 1 mg using an associated camera projection matrix in C. In these embodiments, two 2D points, each composed by coordinates (u, v) in image space, are created for each image. A reference camera c$_{ref}$ ∈C with its associated image img$_{ref}$∈Img can be selected, and an affine transformation for each remaining image in Img−{img$_{ref}$} can be calculated.

Given an image img∈Img and its sets of 2D points p$_{img}$, p'$_{img}$ computed from P and P' and the reference image img$_{ref}$ and its sets of 2D points p$_{img_{ref}}$, p'$_{img_{ref}}$, an affine transformation matrix T$_{img \to img_{ref}}$ can be defined as:

$$\begin{bmatrix} a & b & c \\ -b & a & d \end{bmatrix}$$

In many embodiments, an affine transformation matrix can be solved for by solving for a linear system Ax=b where x represents values of a, b, c, d that define an affine transformation. In these or other embodiments, A can be determined by:

$$\begin{bmatrix} u_{img} & v_{img} & 1 & 0 \\ v_{img} & -u_{img} & 0 & 1 \\ u'_{img} & v'_{img} & 1 & 0 \\ v'_{img} & -u'_{img} & 0 & 1 \end{bmatrix}.$$

In various embodiments, b can be determined by:

$$\begin{bmatrix} u_{img_{ref}} \\ v_{img_{ref}} \\ u'_{img_{ref}} \\ v'_{img_{ref}} \end{bmatrix}.$$

In many embodiments, a solved affine transformation can allow p$_{img}$, p'$_{img}$ to be transformed, thereby aligning with p$_{img_{ref}}$, p'$_{img_{ref}}$ and creating a 2D rotation axis for images in Img. In many embodiments, an affine translation can be computed continuously as new zoom selection points and/or zoom rotation points are received from a user. In this way, a fly-by simulation of a 3D display can be generated as a user navigates around the 3D display.

In many embodiments, method 600 can comprise an optional activity 613 of calling coordinates of one point. In some embodiments, activity 613 can be performed as a part of or concurrently with one or more of activities 610-612. In these or other embodiments, 3D coordinates of a zoom selection point and/or a zoom rotation point can be stored in one or more of image capture system 310 (FIG. 3), image rendering system 330 (FIG. 3), and/or 3D display system 350 (FIG. 3). In this way, memory and processing power on lower quality computer systems (e.g., user computer 360) can be left available for performing other operations. For example, an affine transformation can be computed on user computer 360 (FIG. 3). In embodiments where user computer 360 (FIG. 3) computes an affine transformation, a smoother zoomed rotation can be achieved by avoiding bottlenecks in network transmission of images aligned by the affine transformation.

In many embodiments, an affine transformation can result in a zoomed 3D display of the object being warped and/or distorted at certain points (e.g., at points that would not normally be visible using an original axis of rotation for the 3D display). In these embodiments, an arc of rotation of the zoomed 3D display can be constrained so that these warped portions are not visible, not displayed, or not rendered for the display of the zoomed 3D display. In various embodiments, warping and/or distortion can be mitigated by restricting an arc of rotation for the zoomed 3D display. For example, an arc of rotation can be restricted to one quadrant of rotation. In these or other embodiments, a restricted arc of rotation can be defined with reference to an object displayed in the 3D display. For example, when an object is an approximately rectangular object (e.g., an automobile), an arc of rotation can be restricted to one side of the rectangle (e.g., 45° in each direction from a midpoint on the side). In these embodiments, when an axis of rotation is not centered on the midpoint of the side, the arc of rotation can end when it intersects with a plane 45° from the midpoint.

Figure 7:
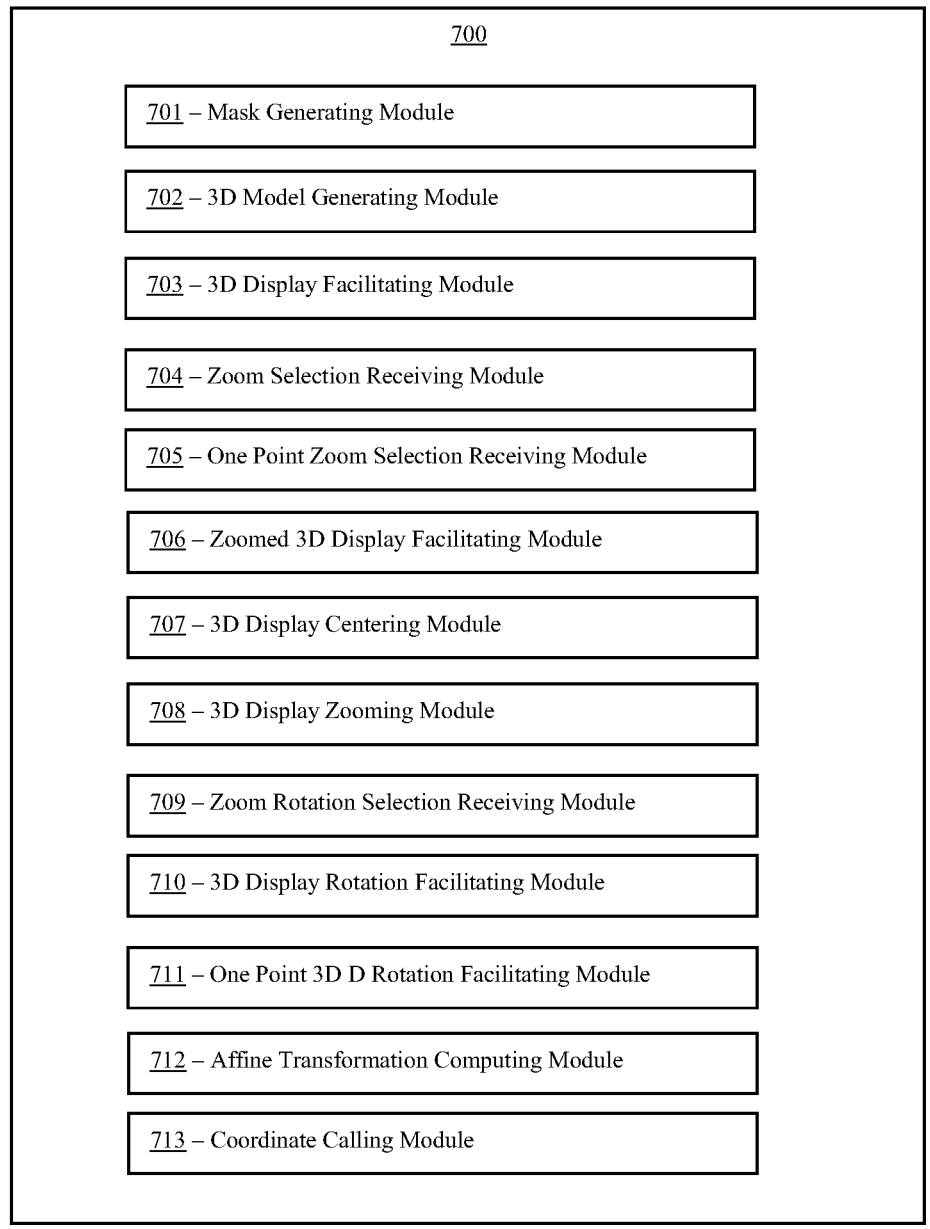
FIG. 7 illustrates a representative block diagram of a system, according to an embodiment.

Turning ahead in the drawings, FIG. 7 illustrates a block diagram of a system 700 that can be employed for behavior based messaging. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as mask generating module 701. In many embodiments, mask generating module 701 can store computing instructions configured to run on one or more processing modules and perform one or more acts of method 600 (FIG. 6) (e.g., activity 601 (FIG. 6)).

In many embodiments, system 700 can comprise non-transitory memory storage module 702. Memory storage module 702 can be referred to as 3D model generating module 702. In many embodiments, 3D model generating module 702 can store computing instructions configured to run on one or more processing modules and perform one or more acts of method 600 (FIG. 6) (e.g., activity 602 (FIG. 6)).

In many embodiments, system 700 can comprise non-transitory memory storage module 703. Memory storage module 703 can be referred to as 3D display facilitating module 703. In many embodiments, 3D display facilitating 703 can store computing instructions configured to run on one or more processing modules and perform one or more acts of method 600 (FIG. 6) (e.g., activity 603 (FIG. 6)).

In many embodiments, system 700 can comprise non-transitory memory storage module 704. Memory storage module 704 can be referred to as zoom selection receiving module 704. In many embodiments, zoom selection receiving module 704 can store computing instructions configured to run on one or more processing modules and perform one or more acts of method 600 (FIG. 6) (e.g., activity 604 (FIG. 6)).

In many embodiments, system 700 can comprise non-transitory memory storage module 705. Memory storage module 705 can be referred to as one point zoom selection receiving module 705. In many embodiments, one point zoom selection receiving module 705 can store computing instructions configured to run on one or more processing modules and perform one or more acts of method 600 (FIG. 6) (e.g., activity 605 (FIG. 6)).

In many embodiments, system 700 can comprise non-transitory memory storage module 706. Memory storage module 706 can be referred to as zoomed 3D display facilitating module 706. In many embodiments, zoomed 3D display facilitating module 706 can store computing instructions configured to run on one or more processing modules and perform one or more acts of method 600 (FIG. 6) (e.g., activity 606 (FIG. 6)).

In many embodiments, system 700 can comprise non-transitory memory storage module 707. Memory storage module 707 can be referred to as 3D display centering module 707. In many embodiments, 3D display centering module 707 can store computing instructions configured to run on one or more processing modules and perform one or more acts of method 600 (FIG. 6) (e.g., activity 607 (FIG. 6)).

In many embodiments, system 700 can comprise non-transitory memory storage module 708. Memory storage module 708 can be referred to as 3D display zooming module 708. In many embodiments, 3D display zooming module 708 can store computing instructions configured to run on one or more processing modules and perform one or more acts of method 600 (FIG. 6) (e.g., activity 608 (FIG. 6)).

In many embodiments, system 700 can comprise non-transitory memory storage module 709. Memory storage module 709 can be referred to as zoom rotation selection receiving module 709. In many embodiments, zoom rotation selection receiving module 709 can store computing instructions configured to run on one or more processing modules and perform one or more acts of method 600 (FIG. 6) (e.g., activity 609 (FIG. 6)).

In many embodiments, system 700 can comprise non-transitory memory storage module 710. Memory storage module 710 can be referred to as 3D display rotation facilitating module 710. In many embodiments, 3D display rotation facilitating module 710 can store computing instructions configured to run on one or more processing modules and perform one or more acts of method 600 (FIG. 6) (e.g., activity 610 (FIG. 6)).

In many embodiments, system 700 can comprise non-transitory memory storage module 711. Memory storage module 711 can be referred to as one point 3D display rotation facilitating module 701. In many embodiments, one point 3D display rotation facilitating module 711 can store computing instructions configured to run on one or more processing modules and perform one or more acts of method 600 (FIG. 6) (e.g., activity 611 (FIG. 6)).

In many embodiments, system 700 can comprise non-transitory memory storage module 712. Memory storage module 712 can be referred to as affine transformation computing module 712. In many embodiments, affine transformation computing module 712 can store computing instructions configured to run on one or more processing modules and perform one or more acts of method 600 (FIG. 6) (e.g., activity 612 (FIG. 6)).

In many embodiments, system 700 can comprise non-transitory memory storage module 713. Memory storage module 713 can be referred to as coordinate calling module 713. In many embodiments, coordinate calling module 713 can store computing instructions configured to run on one or more processing modules and perform one or more acts of method 600 (FIG. 6) (e.g., activity 613 (FIG. 6)).

Although systems and methods for rendering a portion of a 3D display and systems and methods for rotating a 3D display have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for generating an image of an automobile, the system comprising:
   one or more processors; and
   one or more non-transitory computer-readable storage devices storing computing instructions configured to communicate with the one or more processors and cause the one or more processors to perform operations comprising:
   generating an artificial surface for a 3D model of the automobile;
   blending the artificial surface for the 3D model of the automobile with a real-world surface of the automobile to create a blended surface that comprises both the artificial surface and the real-world surface; and
   generating the image of the automobile, the image comprising the blended surface, wherein the blended surface has a higher cleanliness level than the real-world surface while the image is displayed on an electronic device.

2. The system of claim 1, wherein the blended surface comprises a floor of a photography studio.

3. The system of claim 1, wherein the image of the automobile displays the automobile in an artificial capture environment.

4. The system of claim 1, wherein the generating the artificial surface comprises generating the artificial surface for the 3D model of the automobile using artificially generated light readings.

5. The system of claim 1, wherein the generating the artificial surface comprises generating the artificial surface comprising simulated reflections or simulated shadows for the 3D model of the automobile.

6. The system of claim 1, further comprising facilitating displaying a 3D display of the automobile, wherein the 3D display comprises the image.

7. The system of claim 1, further comprising transferring the blended surface to one or more images of the automobile by aligning a horizon line of the artificial surface with one or more horizon lines in the one or more images of the automobile.

8. A method for generating an image of an automobile, the method comprising:
   generating, by one or more processors, an artificial surface for a 3D model of the automobile;
   blending, by the one or more processors, the artificial surface for the 3D model of the automobile with a real-world surface of the automobile to create a blended surface that comprises both the artificial surface and the real-world surface; and
   generating, by the one or more processors, the image of the automobile, the image comprising the blended surface, wherein the blended surface has a higher cleanliness level than the real-world surface while the image is displayed on an electronic device.

9. The method of claim 8, wherein the blended surface comprises a floor of a photography studio.

10. The method of claim 8, wherein the image of the automobile displays the automobile in an artificial capture environment.

11. The method of claim 8, wherein the generating the artificial surface comprises generating, by the one or more processors, the artificial surface for the 3D model of the automobile using artificially generated light readings.

12. The method of claim 8, wherein the generating the artificial surface comprises generating, by the one or more processors, the artificial surface comprising simulated reflections or simulated shadows for the 3D model of the automobile.

13. The method of claim 8 further comprising facilitating displaying, by the one or more processors, a 3D display of the automobile, wherein the 3D display comprises the image.

14. The method of claim 8, further comprising transferring, by the one or more processors, the blended surface to one or more images of the automobile by aligning a horizon line of the artificial surface with one or more horizon lines in the one or more images of the automobile.

15. One or more articles of manufacture for generating an image of an automobile, the one or more articles of manufacture including one or more non-transitory, tangible computer readable storage media having instructions stored thereon that, in response to execution by one or more computers, cause the one or more computers to perform operations comprising:
   generating an artificial surface for a 3D model of the automobile;
   blending the artificial surface for the 3D model of the automobile with a real-world surface of the automobile to create a blended surface that comprises both the artificial surface and the real-world surface; and
   generating the image of the automobile, the image comprising the blended surface, wherein the blended surface has a higher cleanliness level than the real-world surface while the image is displayed on an electronic device.

16. The one or more articles of manufacture of claim 15, wherein the blended surface comprises a floor of a photography studio.

17. The one or more articles of manufacture of claim 15, wherein the image of the automobile displays the automobile in an artificial capture environment.

18. The one or more articles of manufacture of claim 15, wherein the generating the artificial surface comprises generating the artificial surface for the 3D model of the automobile using artificially generated light readings.

19. The one or more articles of manufacture of claim 15, wherein the generating the artificial surface comprises generating the artificial surface comprising simulated reflections or simulated shadows for the 3D model of the automobile.

20. The one or more articles of manufacture of claim 15, further comprising transferring the blended surface to one or more images of the automobile by aligning a horizon line of the artificial surface with one or more horizon lines in the one or more images of the automobile.

* * * * *